A. P. LUNDIN & H. W. BROADY.
HEAT INSULATIVE CONTAINER.
APPLICATION FILED JAN. 21, 1916.
1,288,073.
Patented Dec. 17, 1918.
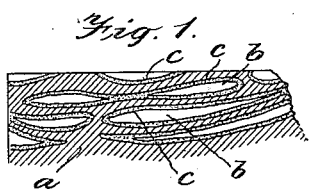
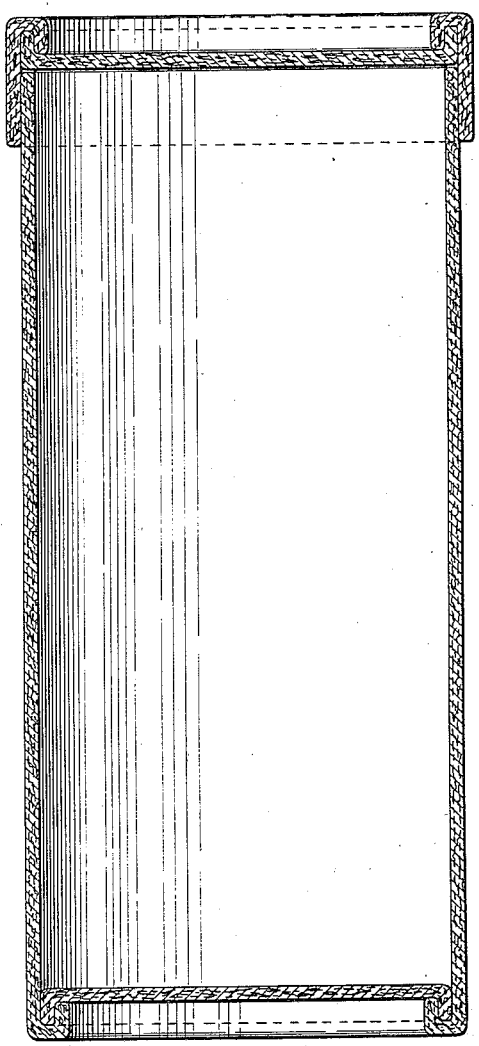

UNITED STATES PATENT OFFICE.

ANDREAS P. LUNDIN AND HARRY W. BROADY, OF BAYSIDE, NEW YORK, ASSIGNORS TO AMERICAN BALSA CORPORATION, OF LONG ISLAND CITY, NEW YORK, A CORPORATION OF NEW YORK.

HEAT-INSULATIVE CONTAINER.

1,288,073.  Specification of Letters Patent.  Patented Dec. 17, 1918.

Application filed January 21, 1916. Serial No. 73,503.

*To all whom it may concern:*

Be it known that we, ANDREAS P. LUNDIN and HARRY W. BROADY, citizens of the United States, and residents of Bayside, in the county of Queens and State of New York, have invented certain new and useful Improvements in Heat-Insulative Containers, of which the following is a description in such full, clear, and exact terms as will enable any person skilled in the art to which it pertains to make and use the same.

According to our invention we employ a porous or cellular material which may be either natural or artificial and which is preferably itself of a non-conducting nature. Various forms of extremely porous wood have been successfully used by us and artificial materials such as thick pulp or mill board of blotting-paper-like character. These materials in their natural and perfectly dry state form very good insulators but experience has shown that they cannot be practically used in exposed situations because of the readiness with which they absorb moisture either from water actually deposited thereon or in the form of vapor in the atmosphere. When thus soaked or charged with moisture these porous materials become practically solids, their numerous cavities or air insulation cells disappear and the substance is entirely deprived of its insulative properties.

By means of our invention we are enabled to overcome this difficulty and to cause the porous materials to retain at all times and under all conditions the insulation properties which it has naturally in its dry state. In doing this we so treat the porous material that the walls of its numerous cavities, cells or inter-cellular spaces are covered or coated with a non-conducting moisture resistant. This treatment should extend deeply into the porous material and through and through the same when its thickness or bulk will admit. The result of thus internally treating or coating the cavity walls of the porous material is to seal and preserve the numerous dead air spaces or cavities in the porous material and to prevent absorption of moisture so that the porous material retains its natural insulating properties and is prevented from taking up moisture which would destroy the same.

Our invention is to be clearly distinguished from a porous material the cavities or cells of which are completely filled up with a moisture resistant or in other words merely painting the porous material. In the course of our experiments we have endeavored to treat porous materials with the ordinary and indeed with numerous forms of paint, but this has been uniformly unsatisfactory and insufficient because the liquid paint is soaked up by the porous material and simply fills or loads up the cavities of the same and transforms it into a solid material and the materials of the paint are not insulation of any satisfactory nature so that the porous material is rendered entirely unfit for use in accordance with our invention.

Reference is now had to the accompanying drawing in which Figure 1 is a section showing the method of treating the porous material, which view, of course, is very much exaggerated for the purpose of illustration and Fig. 2 is a sectional view showing one of the uses of our invention, *i. e.*, its use as a heat insulator or barrier.

Referring to Fig. 1 *a* indicates the porous material employed in our invention which as we have above stated may be a natural material such as various forms of extremely light porous wood or cork or it may be an artificial material such as heavy mill or paste board of loose, porous formation like heavy blotting paper for example. *b* represents the numerous cavities or spaces which are to be found in such materials. Some times they are clearly visible to the naked eye and some times they appear only under the microscope. *c* represents the lining on the walls of the cavities or interior spaces of the porous material with the non-conducting water resistant. At this point it is again noted that the cavities of the porous material must not be filled or plugged up, so to speak, but on the contrary the cavity surfaces or walls only must be lined or coated with the water resistant.

We have found that this beneficial end may be attained by heating a mixture of hydro-carbons, preferably paraffin and asphaltum, to liquidity and to a temperature of 212° F. or greater, and submerging the porous material in said heated mixture. The porous material when so submerged may be in a perfectly dry state or it may be soaked with water. This is immaterial to the success of our invention because if it is soaked with water the water is immediately transformed into steam by the heated mixture which is at a temperature above the boiling point of water and is driven off from the porous material. This may be observed with the naked eye by the active bubbling or ebullition of the heated mixture when the wet porous material is submerged therein. The porous material is permitted to stay in this heated mixture for an interval of about ten or fifteen minutes or more according to the bulk of the material being treated during and by which the moisture, if there is any, is driven off and by peculiar natural phenomena the porous material when withdrawn from the bath is found to be lined along its cell walls with the mixture of hydrocarbons in the manner illustrated in Fig. 1. The best materials which we have found for this purpose is a mixture of about 75 parts paraffin and 25 parts asphaltum. We have conducted numerous experiments along these lines extending over a number of years and know of no better compound though others are possible such as naphthalin and paraffin or naphthalin and rosin.

Fig. 2 illustrates a striking example of the practical application of our improved insulation material in the construction of a heat insulated container for transporting and preserving perishable liquids. This is formed preferably of an artificial porous material such as heavy blotting paper or light porous pasteboard treated in the fashion herein described and with a tight fitting cap or closure as illustrated. This treatment not only transforms the container into a barrier to heat but also and at the same time makes it watertight so that liquids may be carried and preserved in the container indefinitely. Among the other numerous uses to which this particular embodiment of our invention may be put may be cited the instance of milk bottles: The milk bottles constructed according to our invention as shown in Fig. 2 may be filled at the creamery with the milk taken from the cold or refrigerated vats and transported in the container by railroad, wagon, etc., and delivered to the door of the consumer without the use of ice in any manner, the insulative properties of the improved material of which the container is constructed being sufficient to preserve the milk at low temperature for 24 or 48 hours or any reasonable length of time.

The invention may also be used as an insulator or barrier of electricity, and sound and vibration in the manners customary in these arts and indeed in any situation where insulation is desirable, excepting in those cases involving high temperatures which would melt or destroy the porous material or the water resistants with which it is treated.

Having thus described our invention what we claim as new and desire to secure by Letters Patent of the United States, is:

1. A heat insulative container formed of a porous, non-conducting material, the walls of its cavities or interior spaces being coated internally with a water resistant, but said cavities themselves not being filled thereby, whereby said container is at once rendered watertight and heat insulative.

2. A heat insulative container constructed of porous material, the walls of the cavities or inner spaces of which are coated internally with a water resistant mixture of hydro-carbons, but said cavities themselves not being filled thereby, whereby said container is at once rendered watertight and heat insulative.

In testimony whereof we have hereunto signed our names in the presence of two witnesses.

ANDREAS P. LUNDIN.
HARRY W. BROADY.

Witnesses:
 ISAAC B. OWENS,
 PATRICK A. BOLGER.